United States Patent [19]

Varga et al.

[11] Patent Number: 5,370,905
[45] Date of Patent: * Dec. 6, 1994

[54] METHOD OF APPLYING PRIMING COATING MATERIALS ONTO GLASS ELEMENTS OF VEHICLES

[75] Inventors: Leslie J. Varga, Amherst; James E. DeVries, North Olmsted; Robert D. Schneider, Vermilion, all of Ohio

[73] Assignee: Nordson Corporation, Westlake, Ohio

[*] Notice: The portion of the term of this patent subsequent to Jan. 11, 2011 has been disclaimed.

[21] Appl. No.: 145,961

[22] Filed: Oct. 29, 1993

Related U.S. Application Data

[63] Continuation-in-part of Ser. No. 855,973, Mar. 23, 1992, Pat. No. 5,277,927.

[51] Int. Cl.$^5$ ................................................. B05D 5/00
[52] U.S. Cl. .................................... 427/168; 427/284; 427/287; 427/355; 427/163.1
[58] Field of Search ............. 427/284, 287, 355, 407.2, 427/421, 424, 163, 168

[56] References Cited

U.S. PATENT DOCUMENTS

| | | | |
|---|---|---|---|
| 3,723,989 | 3/1973 | Fathauer et al. | 340/259 |
| 4,102,177 | 7/1978 | Okada et al. | 73/32 R |
| 4,141,390 | 2/1979 | Arnold et al. | 141/9 |
| 4,166,948 | 9/1979 | Steffen | 250/214 B |
| 4,260,258 | 4/1981 | Rose et al. | 356/335 |
| 4,367,244 | 1/1983 | Holmes et al. | 427/8 |
| 4,498,901 | 2/1985 | Finch | 604/65 |
| 4,503,806 | 3/1985 | Prusak et al. | 118/712 |
| 4,605,569 | 8/1986 | Shimada et al. | 427/284 |
| 4,673,820 | 6/1987 | Kamen | 250/573 |
| 4,680,462 | 7/1987 | Kamen | 250/222.1 |
| 4,680,977 | 7/1987 | Conero et al. | 73/861.41 |
| 4,720,636 | 1/1988 | Benner, Jr. | 250/573 |
| 4,736,704 | 4/1988 | Henninger | 118/688 |
| 4,753,819 | 6/1988 | Shimada | 427/96 |
| 4,820,281 | 4/1989 | Lawler, Jr. | 604/253 |
| 4,857,367 | 8/1989 | Thorn et al. | 427/348 |
| 4,880,663 | 11/1989 | Shimada | 427/96 |
| 4,935,261 | 6/1990 | Srivastava et al. | 427/10 |
| 5,002,539 | 3/1991 | Coble et al. | 604/253 |
| 5,012,496 | 4/1991 | Weinreb et al. | 377/21 |
| 5,045,069 | 8/1991 | Imparto | 604/253 |
| 5,049,368 | 9/1991 | Turner, Jr. | 427/424 |
| 5,054,650 | 10/1991 | Price | 222/1 |
| 5,131,349 | 7/1992 | Keller et al. | 118/203 |
| 5,277,927 | 1/1994 | Burns et al. | 427/8 |

FOREIGN PATENT DOCUMENTS 0379908 8/1990 European Pat. Off.

OTHER PUBLICATIONS

Automotive Glass Bonding, Nordson Corporation, Issued Apr. 1992.

*Primary Examiner*—Shrive Beck
*Assistant Examiner*—Katherine A. Bareford
*Attorney, Agent, or Firm*—Raymond J. Slattery, III

[57] ABSTRACT

A method of applying a clear glass primer material and then a black glass primer material onto the marginal edge (40) of a vehicular window glass (42), such as a windshield and/or rear window of an automobile, in which a dispenser (38) is employed to discharge a clear primer material in discrete streams or drops and in which a black primer material is conformally coated onto the clear primer material by another dispenser (36). The clear and black primer materials are able to be applied to the window glass in a single pass operation.

12 Claims, 3 Drawing Sheets

METHOD OF APPLYING PRIMING COATING MATERIALS ONTO GLASS ELEMENTS OF VEHICLES

This is a continuation-in-part of co-pending application Ser. No. 07/855,973, filed on Mar. 23, 1992, now U.S. Pat. No. 5,277,927.

FIELD OF THE INVENTION

This invention relates to preparing the window glass of automobiles or other vehicles for bonding with an associated body flange of the vehicle, and, more particularly, to a method of applying glass primer coatings onto the marginal edge of the windshield or other glass elements of the vehicle, in preparation of adhesively bonding the glass and body flange together.

BACKGROUND OF THE INVENTION

The assembly of the windshield, rear window and other glass elements of a vehicle to their associated body flanges is an important operation in the manufacture of vehicles, particularly from a safety standpoint. The federal government requires vehicles to pass a windshield retention test, and the materials which are used to assemble the windshield to the body flanges of the vehicle must be properly applied in order to pass the test and avoid expensive recalls.

The preparation of the windshield and associated body flange of a vehicle for assembly involves a number of operations. With respect to the windshield, glass manufactures supply automobile windshields with a "blackened area", i.e., an area of predetermined width along the marginal edge of the windshield which is covered with a black, ceramic frit having a roughened surface. It is the responsibility of the automotive manufacturer to prepare this blackened area for assembly to the body flange of the vehicle. First, a clear glass primer material is applied to the blackened area, usually with a wet brush manipulated by a robot or other automated brush mover. The primer may be applied to the bristles of the brush by dispensing the primer through the center of the brush. Preferably, a felt wick is dragged by the robot immediately behind the wet brush to wipe dry the clear glass primer, and to force the clear glass primer into the roughened surface of the blackened area. The clear glass primer prepares the blackened area for receipt of a coat of black glass primer material.

The next step in the preparation of the windshield for assembly to the vehicle body flange involves the application of a black glass primer over the area which had been previously coated with the clear glass primer. One method of applying the black glass primer to the windshield involves a manual operation using a flow brush or the like. This method is labor-intensive, and human applicators are prone to dripping some of the black glass primer from the brush onto areas outside of the blackened, ceramic frit. Such drips onto the clear portion of the glass are unacceptable and may require rejection of the windshield for use. Alternatively, the black material may be applied similarly to that used for the clear primer.

Another method shown schematically in FIG. 1, is to provide a continuous stream or intermittent streams, or drops, of primer onto the windshield which are then distributed by a trailing pad of felt. A coating tool assembly 10 has been employed which carried two dispensing guns 12, 14 and a gripper assembly 16 which carries a pad or wick of felt 18. The dispensing guns 12, 14 have been oriented at an angle A which is substantially less than 45° from the vertical centerline CL of the gripper assembly 16. For example, assemblies have been used wherein the angle A has been in the range of 20°-25°. In this manner, the stream or drops 20 of fluid are dispensed substantially in front of the felt 18, the direction of movement of the assembly being indicated by arrow 22, were the trailing pad of felt is used to distribute and wipe the excess of the material from the glass 24. One problem with this method is that splashing of the primer outside of the blackened area onto the clear portions of the window may occur. Another problem is that with a continuous stream of fluid, it is difficult to control the exact amount of fluid applied to the glass.

Another means of applying the black glass primer onto the marginal edge of the windshield is disclosed, for example, in U.S. Pat. No. 4,857,367 to Thorn et al. This patent discloses an apparatus which comprises a liquid spray nozzle, an air nozzle and a vacuum device which are movable as a unit upon a robot arm relative to the marginal edge of a windshield. The liquid nozzle sprays atomized black glass primer material in a triangular pattern onto the edge of the windshield. In order to prevent oversprayed, atomized black glass primer from being deposited onto the clear portion of the windshield, the air nozzle directs a stream of air from the interior of the windshield outwardly so as to force any oversprayed primer particles away from the interior or clear portion of the windshield. The vacuum device is located beneath and alongside the peripheral edge of the windshield to draw a vacuum and collect the oversprayed primer particles which do not adhere to the glass.

While systems of the type disclosed in U.S. Pat. No. 4,857,367 are intended to avoid the drippage problem obtained with manual application of the black primer, it has been found that the application of at least some black glass primer onto the clear portion of the windshield can still occur. The vacuum device is not completely effective in collecting the oversprayed, atomized black glass primer discharged from the liquid nozzle, and some of this oversprayed black glass primer can fall onto the clear portion of the windshield.

The function of the black primer is to bond to the clear glass primer and to provide a good bonding site to beads of adhesive or sealants, such as illustrated in EPO 379 908 assigned to Essex Specialty Products, Inc. in the assembly of automobile windshields. The black primer also acts as a blocking agent for blocking the transmission of ultra violet light to the beads of adhesive or sealant. The ceramic frit does not completely block the transmission of ultra violet light. Therefore, improper application of the black primer may result in improper bonding of the adhesive/sealant and/or the degradation of the seal due to the ultra violet light.

In an automotive assembly plant, the overall time necessary to manufacture a vehicle is important. Each phase of the assembly operation is reviewed to maximize efficiency. All of the above methods require two passes about the periphery of the glass, one pass for the clear primer and a second pass for the black. It is therefore desirous to reduce the number of passes necessary for preparing the glass, thereby reducing the amount of time necessary to prepare the glass for assembly.

SUMMARY OF THE INVENTION

It is therefore among the objectives of this invention to provide a method of applying the primer coatings to the marginal edge of the windshield or other glass sections of a vehicle, in which a consistent, uniform coating of primer material is produced and in which dripping, running and/or overspray of the primer material is avoided in a single pass operation.

These and other objects, features, and advantages of the invention may be accomplished by: causing a wick means and first and second dispensing means to be moved together relative to the glass; intermittently dispensing a first fluid coating material from said first dispenser means such that streams or drops of the first coating material are propelled under pressure to impinge upon the glass while substantially avoiding the application of liquid coating material outside a portion of the glass to be coated; distributing the dispensed fluid material over the portion of the substrate to be coated by said wick means; and dispensing a second coating material from said second dispensing means such that a liquid film emission is discharged from said second dispensing means, the liquid film emission being substantially free of atomized particles of the second coating material, to provide a conformal coating to the first coating material.

These and other objects, features, and advantages of the invention may also be accomplished by: a first dispensing means for intermittently dispensing a first fluid coating material such that streams or drops of the first coating material are propelled under pressure to impinge upon a portion of the glass to be coated; a wick means for distributing the dispensed fluid coating material over the portion of the glass to be coated; and a second dispensing means for dispensing a second coating material as a film emission, the film emission being substantially free of atomized particles of the second coating material, over the portion of the glass to be coated.

DESCRIPTION OF THE DRAWINGS

The following is a brief description of the drawings in which.

DETAILED DESCRIPTION OF THE INVENTION

Figure 1:
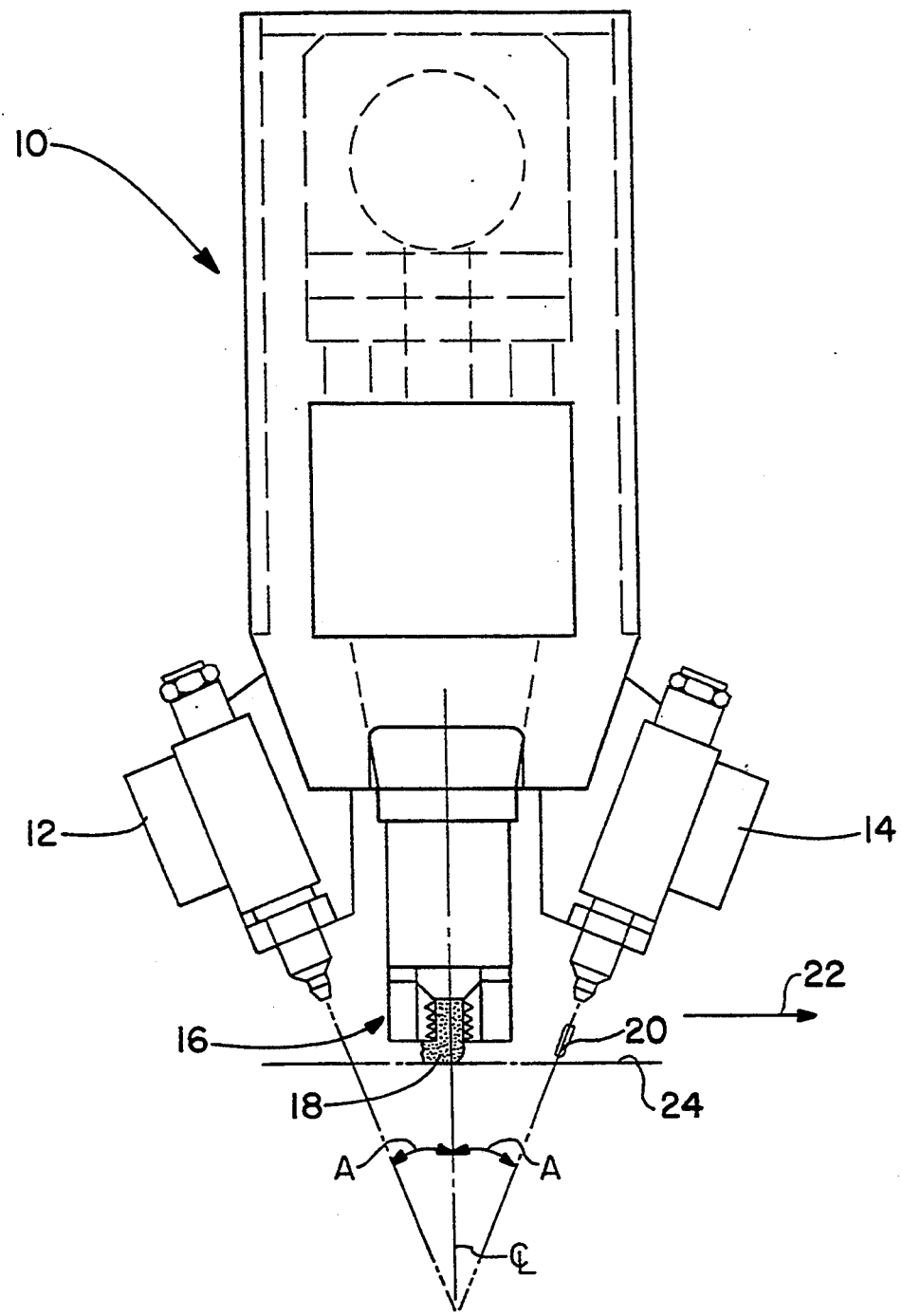
FIG. 1 is a schematic view of a prior art method of applying primer materials to the marginal edge of glass.
Figure 2:
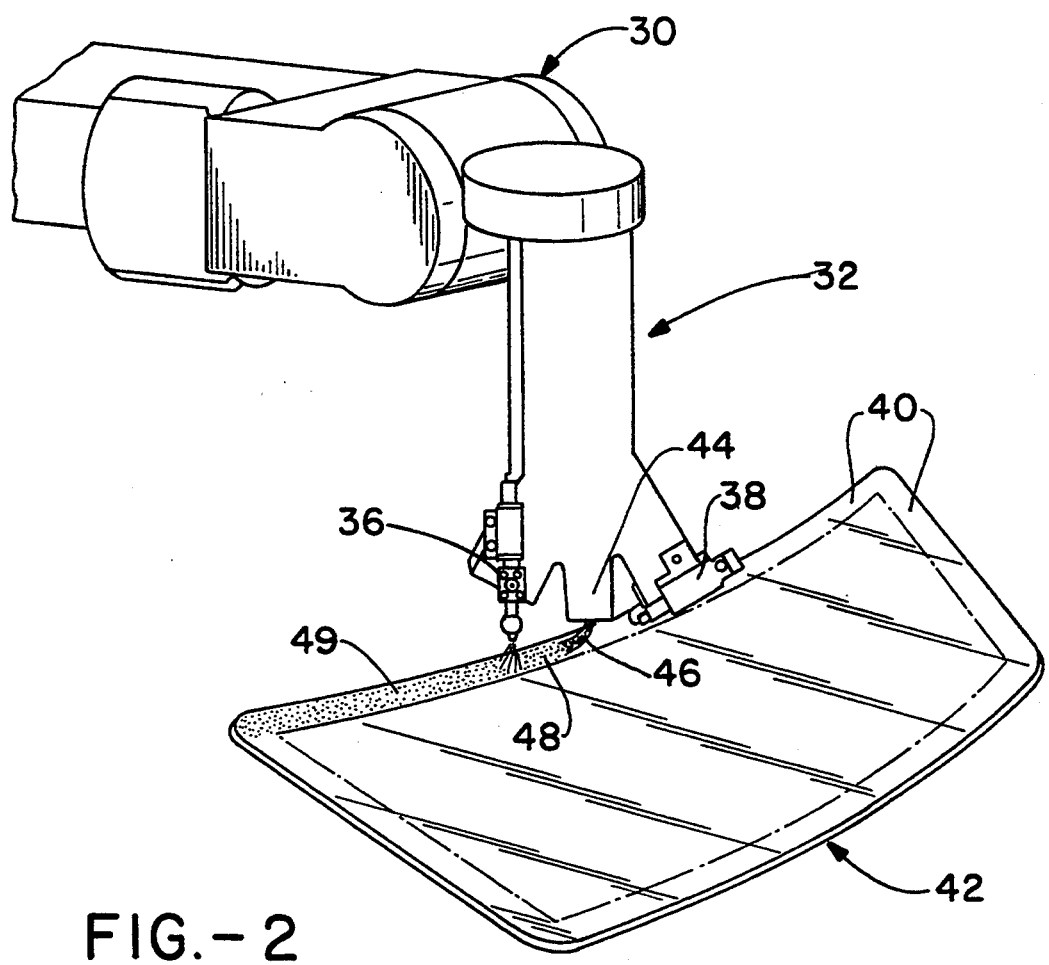
FIG. 2 is a schematic view of the application of the clear glass primer material onto the marginal edge of a windshield of a vehicle with the black primer material being deposited onto the clear primer material in a single pass operation.

With reference to FIG. 2, there is schematically illustrated a portion of an industrial robot arm 30, such as, for example, the type employed in the assembly of automobiles or other vehicles. Attached to the end of the robot arm 30 is a coating tool assembly, shown generally as reference numeral 32. The coating tool assembly includes a support member 34 for carrying two dispensing guns 36, 38 for dispensing the glass primer coatings onto the marginal edge 40 of the windshield 42 or other glass elements used in the assembly of vehicles. A gripper assembly 44, also attached to the support member 34, carries a pad or wick of felt 46 to uniformly disperse the clear coating material 48 (dispensed by dispensing gun 38) uniformly about the marginal edge 40 of the windshield 42. The black coating material 49 is then dispensed onto the clear coating material by dispensing gun 36. In the preferred embodiment, an airless, non-atomizing conformal coating method is used to dispense the black primer onto the clear primer by dispensing gun 36.

Figure 3:
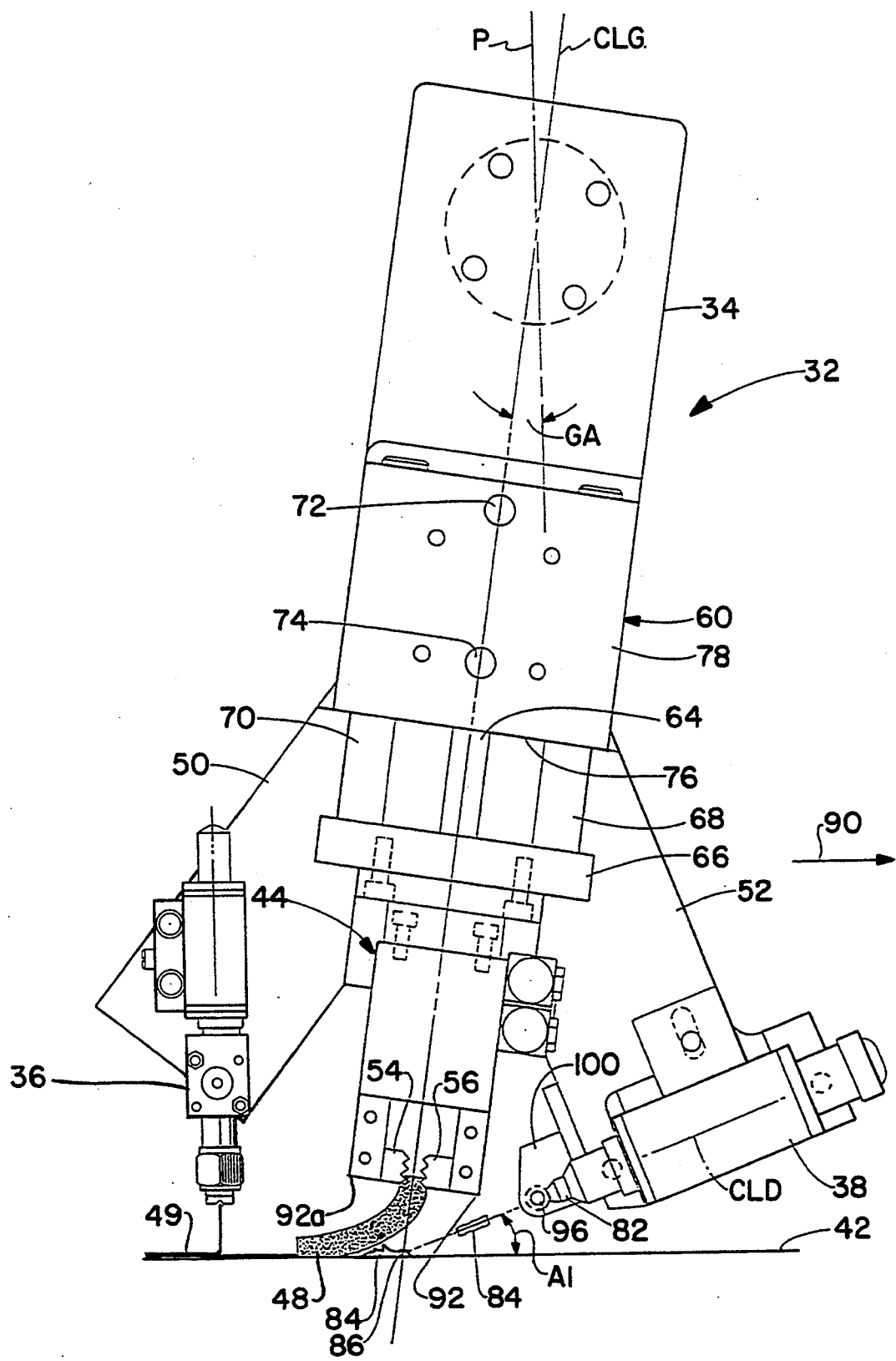
FIG. 3 is an enlarged elevational view of an embodiment of the invention according to the schematic of FIG. 2.

Now with reference to FIG. 3, there is illustrated an enlarged elevational view of one embodiment of the invention according to the schematic of FIG. 2. The central support member 34 may include two opposed arms 50, 52 for carrying the dispensing guns 36, 38 respectively. Dispensing gun 38 may be a pneumatic actuated gun such as the fluid valve guns of the 0.2 and 0.5 mm type used for clear or black prime systems manufactured by Nordson Corporation, Amherst, Ohio, or, alternatively, the H200 Zero Cavity Gun, also manufactured by Nordson Corporation.

The gripper assembly 44 may be a pneumatic actuated device having a pair of jaws 54, 56 which open to receive a wick or pad of felt 46 and then close to retain it therein. The gripper assembly 44 may be coupled to a slide assembly 60 through an adapter block assembly 62.

The slide 60 includes an air actuated cylinder (not shown) which drives a piston 64 which is attached to a mounting bar 66. Coupled to the mounting bar 66 is the adapter block assembly and a pair of linear bearing slides 68, 70. The slide assembly 60 includes two air ports 72, 74 for causing the mounting bar to move from its fully extended position (as shown in FIG. 3) to a retracted position (not shown) juxtaposed to the lower edge 76 of the housing 78. This causes the gripper assembly 44 to be retracted from the fully extended position so that the nozzle 82 of dispensing gun 38 may be cleaned as will be discussed further below.

The slide assembly 60 and the gripper assembly 44 are each available commercially and may be obtained, for example, from Phd Incorporated.

The dispensing gun 38 is mounted such that in operation, discrete streams or drops of liquid primer material will impinge upon the marginal edge to be coated, but will not splash or spray onto the glass outside of this area. Preferably, this may be accomplished by projecting the discrete streams or drops of clear primer 84 such that they will impinge upon the glass in such a manner that if they become deflected or ricochet therefrom, the material will remain within the marginal area and/or become entrapped by the felt 46. In other words, a dispensed discrete stream or drop of clear primer 84 which strikes the glass and is deflected therefrom, should be deflected into the felt 46. In this manner, even if the discrete stream or drop would be broken into smaller droplets or particles due to striking of the glass surface, they should all be retained within the felt. It is therefore believed to be more preferred that the dispensed fluid impinged the glass in the vicinity of the crotch 86 formed between the felt 46 and the glass 42.

Preferably, the clear primer is dispensed from the dispenser 38 under pressure. This causes the discrete stream or drop to be propelled from the gun, similar to a slug. A discrete stream means that the material dispensed may be larger than that commonly thought of as a drop, but is not continuous over the course of the application as would be the case if the gun was continuously actuated during the operation. Rather, the gun is repeatedly cycled on/off during the course of coating the marginal edge of a windshield to produce a series of pulses of material. However, it is preferred that the material be discharged from the nozzle substantially free of atomized particles.

It is believed important that the angle of incident AI in which the stream of material impinges the glass surface be less than 45°. The angle of incident AI may be determined by the angle formed between the glass 42 and the line CLD in which the material is dispensed from the nozzle during application. While coating tool assemblies have been produced in which the angle of incident AI is 30°, it is believed that the preferred range is from about 35° to about 10°.

The felt 46 distributes the dispensed liquid which remains on the glass or that has been absorbed therein, uniformly over the marginal edge of the glass to produce a uniform coating 48. The combination of the wiping action of the felt and the clear primer help to clean the surface of any dirt or other surface impurities which may affect the bonding of coating material to the glass. As illustrated in FIG. 3, the movement of the coating tool assembly 34 is in the direction indicated by arrow 90.

It has been found that by directly dispensing the discrete streams or drops of fluid directly into the felt 46, that splashing or spraying outside of the marginal area may occur. However, bouncing the liquid into the felt appears to dissipate enough of the energy that splashing or spraying does not occur. Therefore, it is preferred not to dispense directly into the felt. Also, it is undesirable to cause the coating tool assembly to exert a high force onto the felt to entrap it between the glass as has been done in the past. Rather, the coating tool assembly should allow the felt wick to have sufficient compliance such that it acts similar to a spring. This can be further accomplished by assuring that felt 46, makes sufficient contact with the glass in order to disburse the coating material, while also having compliance to compensate for deviations in the stand-off distance of the gripper from the glass, such as those caused by robotic programming errors, variations in the glass, and the positioning and retention of the glass by the fixture (not shown) during the coating operation.

It is preferred that the centerline CLG, of the jaws of the gripper assembly 44, is not oriented perpendicularly to the surface of the glass. Rather, it is preferred that the gripper assembly is skewed slightly with respect to the glass. This is desirable in order to assure that the wick 46, when initially dragged across the edge of the windshield, assumes the appropriate curved position and does not become distorted. The distance from the glass to the closest portion of the gripper assembly, i.e., the leading edge 92, is the stand off distance.

Also, it has been found that by angling the gripper from the traditional 90° there will be a corresponding change in the pressure applied by the felt to the glass. This result is achieved due to the changing contact area of the felt with the glass while maintaining the same force applied to the glass and the same felt length. Increasing the angle of the gripper GA, the angle formed between the centerline of the gripper CLG and a line P which is perpendicular to the glass, increases the contact area between the felt and the glass which in turn produces a greater film build. Therefore, the amount of film build may be varied by varying the angle of the gripper. While good results have been obtained with an angle GA of about 9°, it is believed that good results may also be obtained from 1° to 15°, although it is believed that this angle may vary up to about 40°.

It also should be noted that the density of the felt also affects the density of the film build. Typically, the lower the density of the felt, the more softer and more absorbent the felt will be. The more absorbent the felt is, generally will result in higher film builds than less absorbent felt of the same length.

The felt length is also important to the film build of the primer on the glass. Short felt length may result in little contact area, which may produce contact pressures which will result in the snow plowing of the material as described above. On the other hand, felt lengths which are too long may produce an uneven film build. This results due to such an increased contact area that the pressure is greatly reduced or becomes uneven over the total contact length of the felt. Therefore, the length of felt must be long enough that it is compliant, but not too long that the film build becomes uneven.

In the coating of automobile windshields, in which the material supplier has a film build specifically of 3 to 5 mm, good results have been achieved utilizing glass primer coating materials in which:

The angle of the gripper was 9°;
The stand off distance was ⅝";
The angle of incidence was 30°; and
The length of the felt is from about 1.75" to about 2" (not including the felt retained within the jaws of the gripper).

It should be understood that the length of the felt may vary due to change in the stand off distance. For the above, it can be seen that the length of the felt is about three times the stand off distance.

Dispensing gun 36 has an associated pressure regulator (not shown) for controlling the pressure of the black coating material to the dispensing gun. The black primer material is dispensed from the dispenser 36 as a liquid film emission which is substantially free of atomized particles to provide a conformal coating of black material onto the clear coating material after it has been dispensed by the wick. As used in the specification and the claims, "conformal coating" means: An airless, non-atomizing discharge of a coating material. In such a conformal coating method, the discharge outlet of the coating nozzle is configured so that a fan-shaped spray of coating material is applied to the substrate in such a manner so as to prevent the atomization of the coating material. A method of conformal coating is disclosed in U.S. Pat. No. 5,049,368 to Turner and also in U.S. Pat. Nos. 4,753,819 and 4,880,663, both to Shimada, all of which are owned by the assignee of this invention, and in which the disclosures of each are incorporated herein by reference in their entirety. In airless coating techniques, such as disclosed in the above-referenced patents, flat pattern, airless, non-atomizing coating nozzles provide uniform, splashless dispensing onto the clear primer within close tolerances.

Excellent edge control and thickness control have been obtained by utilizing a dispensing gun and its associated nozzle manufactured by Nordson Corporation, 28601 Clemens Road, Westlake, Ohio, 44145, and sold under the trademark Select Coat ® for the black dispensing gun 36.

In that the black coating material needs to be dispensed onto the clear coating material and not directly onto the glass directly, the dispenser 36 is delayed until the coating tool assembly has traversed along the marginal edge of the glass until the clear coating material that has been deposited on the glass is able to be coated by the fan-shaped spray of dispenser 36.

As the coating tool assembly continues to traverse about the marginal edge both dispensing guns 36, 38 continue to dispense coating material until the marginal edge has been coated with the clear coating material. At this point, the dispenser 38 will discontinue the dispensing of the clear primary material while continuing the dispensing of the black coating material until the clear primer has been coated with the black primer.

Once the marginal edge of the windshield has been completely coated with both primers, the jaws 54, 56 of the gripper assembly 44 retract to replace the existing felt 46 with a new felt wick or pad. Once the second coating material has been completely applied, the felt wick 46 will be removed and the slide assembly 60 will retract causing the gripper assembly 44 to be retracted. This will allow the nozzle 82 of the dispensing gun 38 to be brushed in order to clean any dried primer therefrom. Likewise, the nozzle of the dispensing gun 36 may also be brushed in order to clean any dried primer material therefrom.

With reference also to FIG. 2, as the coating tool assembly 32 traverses along the marginal edge 40 of the windshield 42, it may be desirable to vary the number of drops or discrete streams of material dispensed from dispenser 38. For example, as the coating tool assembly begins to provide a coat of clear primer onto the marginal edge of the glass, it may be desirable to provide for more droplets in order to saturate at least a portion of the felt 46. Once the felt 46 has been saturated, the interval between dispensing of streams or drops may then be reduced to a different rate. As the coating assembly continues to traverse its path, it may be necessary to change the rate of dispensing (i.e. varying the number of drops or streams dispensed over a given length of time or distance), the amount of material dispensed (such as varying the "on" time of the gun to vary the volume of material in a given drop or stream), or a combination of both. Therefore, the drops or streams may not be necessarily dispensed uniformly over the entire length of the marginal edge 40. Rather, the peripheral edge may be divided into at least two or more different zones. Such as for example a saturation zone in order to saturate the felt, and another zone comprising the rest of the peripheral area in which the drops or streams are dispensed at a rate to keep the felt saturated uniformly and to provide a uniform coverage over the marginal area of clear primer. More zones may be provided, such as for example, to compensate for going around the corner.

As mentioned above, it is very important to provide a good uniform coverage of each primer material in order to assure the structural integrity of the windshield when applied to the automobile. Therefore, it may be important to be sure that individual streams or droplets of material are actually being dispensed onto the glass. In order to verify the actual dispensing of material, the dispensing gun 38 may be provided with a sensor 96, such as a photoelectric sensor for monitoring the dispensing of the fluid.

The monitoring of the dispensed material and the control thereof may be as described in U.S. Pat. No. 5,277,927 for Method of Applying Primers Onto Glass Elements of Vehicles, and assigned to the assignee of this invention, and in which the disclosure thereof is incorporated herein by reference.

The monitoring of the black primer material may also similarly be monitored by utilizing the detecting and monitoring described above in order to detect the presence or absence of the continuous dispensing of a fan-like pattern of fluid to indicate if the material is being dispensed or not.

While certain representative embodiments and details have been shown for the purposes of illustrating the invention, it will be apparent to those skilled in the art that various changes and modifications may be made therein without departing from the scope of the invention.

It is claimed:

1. A method of dispensing fluid coating materials onto a glass substrate in a single pass comprising the steps of:
   a) causing a wick means and first and second dispensing means to be moved together relative to the glass;
   b) intermittently dispensing a first fluid coating material from said first dispensing means such that stream or drops of the first coating material are propelled under pressure to impinge upon the glass at an angle of incident which is less than 45° while substantially avoiding applying the first liquid coating material outside a portion of the glass to be coated;
   c) distributing the dispensed fluid material over the portion of the substrate to be coated by said wick means; and
   d) dispensing a second coating material from said second dispensing means such that a liquid film emission is discharged from said second dispensing means, the liquid film emission being substantially free of atomized particles of the second coating material, to provide a conformal coating to the first coating material.

2. The method of claim 1 wherein the first fluid material is directed to impinge upon the glass within an area formed between the wick means and the glass or adjacent thereto, and wherein at least some deflected droplets or particles of fluid coating material are entrapped by the wick means.

3. The method of claim 2 further comprising:
   providing a first support arm for carrying said first dispensing means;
   providing a second support arm for carrying said second dispensing means;
   a support means, said first and second support arms attached to said support means; and
   wherein said wick means is disposed between said first and second dispensing means.

4. The method of claim 1 wherein the first and second dispenser means are diametrically opposed to one another and wherein said wick means is disposed between said first and second dispenser means.

5. The method of claim 4 wherein once the first dispensing means first begins dispensing said first coating material,
   the dispensing of said second coating material is delayed until the second dispensing means has been moved relative to the glass to provide a coating of said second coating material onto said first coating material which has been deposited on the glass; and
   once the portion of the glass to be coated has been coated with said first coating material, discontinuing the dispensing of coating material from said first dispensing means while continuing the dispensing and relative movement thereof of the second dispensing means until the first coating material deposited on the substrate has been completely coated with the second coating material.

6. The method of claim 1 wherein the intermittent dispensing of the fluid coating material is varied over the portion of the glass to be coated.

7. The method of preparing window glass for attachment to a vehicle comprising the steps of:
   a) causing relative movement between a coating tool assembly and said window glass;
   b) intermittently dispensing a first fluid coating material from a first dispenser means, carried by said coating tool assembly, such that streams or drops of the first coating material are propelled under pressure to impinge upon a marginal edge of the glass while substantially avoiding the application of liquid coating material outside the marginal edge of the glass to be coated, wherein the fluid material is directed to impinge within an area formed between a wick means, carried by said coating tool assembly, and the glass, or adjacent thereto, such that at least some deflected droplets or particles of fluid coating material are entrapped by the wick means;
   c) distributing the dispensed fluid material, over the marginal edge of the glass to be coated, by said wick means;
   d) delaying the dispensing of a second coating material from a second dispensing means, carried by said coating tool assembly, until said second dispensing means has been moved relative to the glass, so as to provide a conformal coating of said second coating material onto said first coating material which has been deposited on the glass, said second dispensing means dispensing said second coating material as a liquid film emission, substantially free of atomized particles of the second coating material; and
   e) discontinuing the dispensing of coating material from said first dispensing means once the portion of the glass to be coated has been coated with said first coating material, while continuing the dispensing and relative movement thereof of the second dispensing means until the first coating material deposited on the substrate has been completely coated with the second coating material.

8. A method of dispensing fluid coating materials onto a substrate comprising the steps of:
   a. causing relative movement between a first dispensing means and the substrate;
   b. intermittently dispensing a first fluid coating material from said first dispensing means such that streams or drops of the first coating material are propelled under pressure to impinge upon the substrate at an angle of incident which is less than 45° while substantially avoiding applying the first liquid coating material outside a portion of the substrate to be coated;
   c. distributing the dispensed fluid material over the portion of the substrate to be coated; and
   d. causing relative movement between a second dispensing means and the substrate while dispensing a second coating material from said second dispensing means such that a liquid film emission is discharged from said second dispensing means, the liquid film emission being substantially free of atomized particles of the second coating material, to provide a conformal coating onto the first coating material.

9. The method of claim 8 wherein the first and second dispensing means are carried by a coating tool assembly.

10. The method of claim 9 wherein the coating tool assembly includes:
   a first support arm for carrying said first dispensing means;
   a second support arm for carrying said second dispensing means;
   a support means, said first and second support arms attached to said support means; and
   a means for distributing the first fluid material is disposed between said first and second dispensing means.

11. The method of claim 10 wherein the means for distributing the first fluid material includes a wick means wherein the first coating material is directed to impinge upon the substrate within an area formed between the wick means and the substrate or adjacent thereto, and wherein at least some defected droplets or particles of fluid coating material are entrapped by the wick means.

12. The method of claim 8 wherein the intermittent dispensing of the first fluid coating material is varied over the portion of the substrate to be coated.

* * * * *